April 28, 1953  A. E. RANDALL  2,636,309
FISHHOOK HOLDER
Filed March 6, 1952
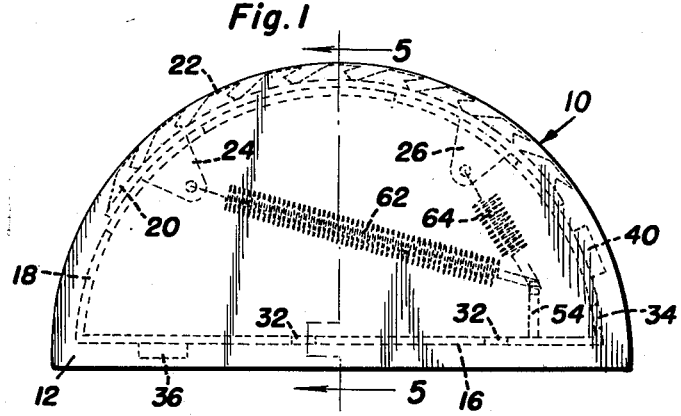
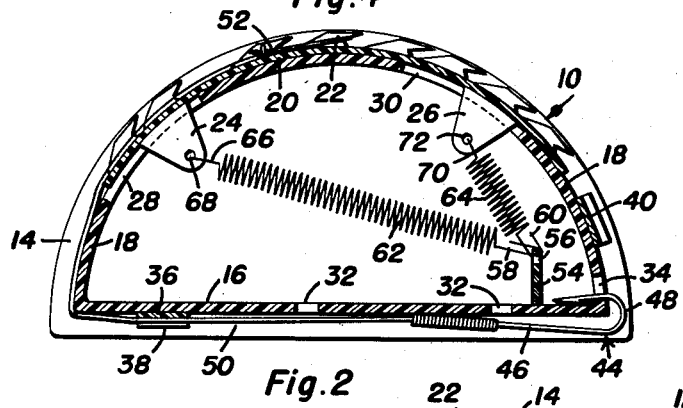
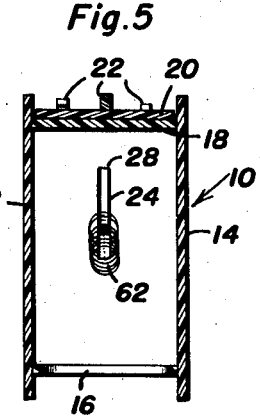
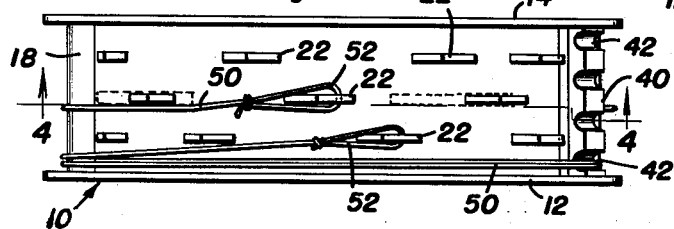
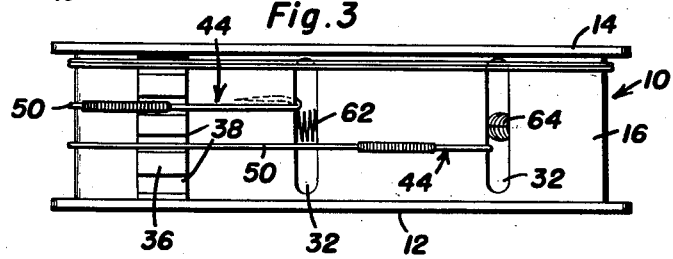
Albert E. Randall
INVENTOR.
BY
Attorneys Patented Apr. 28, 1953

2,636,309

UNITED STATES PATENT OFFICE 2,636,309

FISHHOOK HOLDER

Albert E. Randall, Bellmore, N. Y.

Application March 6, 1952, Serial No. 275,116

7 Claims. (Cl. 43—57.5)

This invention relates to a fish hook holder in general, and more specifically to a fish hook holder in which the hook portions of the fish hooks are disposed in a non-snagging position and the leaders associated with said fish hooks being maintained under tension.

The primary object of this invention is to provide an improved fish hook holder wherein a plurality of fish hooks may be mounted in an operative position with their attached leaders being maintained under tension through the use of a minimum number of spring elements.

Another object of this invention is to provide an improved fish hook holder having means whereby fish hooks of various sizes and having leaders of different lengths may be conveniently attached on a single holder.

Another object of this invention is to provide an improved fish hook holder which may be conveniently formed from plastic material thereby enabling its production at considerably lower cost than structures normally utilized for holding fish hooks and at the same time affording a holder of extremely light weight which is strong and durable.

A further object of this invention is to provide a holder that may be economically and readily manufactured from plastic material and utilizes a minimum number of spring elements for retaining a plurality of fish hooks and their associated leaders in operative positions with their leaders under tension.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and which:

Figure 1 is a side elevational view of the improved fish hook holder, which is the subject of this invention, the various elements of the holder which are obscured by the side wall being clearly illustrated in dotted lines;

Figure 2 is a top plan view of the fish hook holder of Figure 1 and having fish hooks attached thereto with leaders under tension;

Figure 3 is a bottom plan view of the fish hook holder of Figure 1 and showing fish hooks mounted in openings in the bottom wall thereof, the leaders of the fish hooks being maintained in alignment by a guide element secured to the bottom wall of the holder;

Figure 4 is a longitudinal vertical sectional view taken substantially upon the plane indicated by the section line 4—4 of Figure 2 and showing the general relation of a slide member with respect to the housing of the fish hook holder and the manner in which the slide member is spring urged into a leader tensioning position; and Figure 5 is a transverse vertical sectional view taken substantially upon the plane indicated by the section line 5—5 of Figure 1 and showing the general construction of the housing and the relationship of the slide member with respect to the top portion of the housing.

Similar characters of reference designate similar or identical elements and portions through the specification and throughout the different views of the drawings.

Referring now to the drawings in detail, it is seen that the fish hook holder, which is the subject of this invention, includes a housing which is referred to in general by the reference numeral 10. The housing 10 includes a pair of spaced parallel identical semi-circular side walls 12 and 14, a flat horizontal bottom wall 16 extending between and secured to the side walls 12 and 14 adjacent the bottom edges thereof, and an arcuate top wall portion 18 which is formed as a continuation of the bottom wall 16 and which extends between the side walls 12 and 14. It will be noted that the arcuate top wall portion 18 extends through an angle of substantially 180° and is spaced inwardly of the arcuate edge portions of the side walls 12 and 14.

Slidably mounted on the arcuate top wall portion 18 is an arcuate slide member 20 which is shorter than the arcuate top wall portion 18. Carried by the exterior surface of the arcuate slide member 20 are a plurality of hook elements 22 which open to the right as viewed in the drawings.

In order that the movement of the arcuate slide member 20 may be restricted, it has substantially the same width as the arcuate top wall portion 18 and is in sliding abutting engagement with the upper portions of the side walls 12 and 14 and is retained against transverse movement thereby. The rotary sliding motion of member 20 along the arcuate top wall portion 18 is limited by a pair of guide elements 24 and 26 which are in the form of triangular ears secured to the under surface of the arcuate slide member 20. The guide elements 24 and 26 pass through elongated slots 28 and 30, respectively, in the arcuate top wall portion 18. The rotary sliding movement of the arcuate slide member 20 is limited by the edges of the guide elements 24 and 26 striking the ends of the slots 28 and 30, respectively.

In order that fish hooks may be secured to the housing 10, the bottom wall 16 is provided with a pair of transversely extending openings 32 in which the hook portions of the fish hooks may be passed. The arcuate top wall portion 18 is provided with a similar fish hook receiving opening 34 at the right end thereof, as viewed in Figure 4, adjacent its intersection with the bottom wall 16. The bottom wall 16 is also provided with a guide member 36 in order that the leaders attached to fish hooks may be maintained in alignment. The guide member 36 is provided with a plurality of longitudinally extending grooves 38 in which the leaders are received. The arcuate top wall portion 18 is provided with a guide member 40 similar to the guide member 36, the guide member 40 having a plurality of spaced parallel grooves 42 therein for receiving the leaders of the fish hooks.

It will be seen that the fish hooks are referred to in general by reference numeral 44 and has a shank portion 46 and a hook portion 48. The shank portion 46 has secured to the free end thereof a conventional gut leader 50 which is provided with a loop end 52.

Referring now to Figure 4 in particular, it will be seen that when it is desired to mount a fish hook 44 and its leader 50 on the fish hook holder, the hook portion 48 of the fish hook 44 may be disposed through the transverse opening 34 in the arcuate top wall portion 18 with the shank portion 46 extending below the bottom wall 16. The leader 50 is then passed through one of the grooves 38 in the guide member 36 and around a portion of the arcuate top wall portion 18 and over a portion of the arcuate slide member 20 and terminating with its loop end 52 hooked around one of the hook elements 22. Since the hook elements 22 are in staggered relation, a hook element 22 will be available for any length of leader 50.

In order that the leader 50 may be maintained under tension, spring means are connected to the arcuate slide member 20 for urging it and its associated hook elements 22 to the right, as viewed in Figure 4. The spring means include an attaching ear 54 secured to the upper surface of the bottom wall 16 adjacent the right end thereof. The attaching ear 54 is provided with an opening 56 adjacent its upper end in which are received hook ends 58 and 60 of coil tension springs 62 and 64, respectively. The coil spring 62 is provided with a second hook end 66 which passes through an opening 68 in the guide element 24. The coil spring 64 is also provided with a second hook end 70 which is received within an opening 72 in the guide element 26. When it is desired to attach the loop end 52 of the leader 50 to one of the hook elements 22, the arcuate slide member 20 is moved to the left, as viewed in Figure 4, against the tension of the springs 62 and 64 and the loop end 52 is attached around a convenient hook element 22. The arcuate slide member 20 is then released and it moves to the right due to the urging of the coil springs 62 and 64 thereby tensioning the leader 50.

It will be noted that the fish hooks 44 and their associated leaders 50, as illustrated in Figure 3, are hooked in the transverse openings 32 in the bottom wall 16 and their leaders pass through different grooves 38 in the guide member 36. In Figure 2, other leaders 50 are illustrated as being attached to different hook elements 22, one of the leaders 50 being of such length that it is wrapped around the housing 10 a complete turn.

In view of the various manners in which the fish hooks 44 and their associated leaders 50 are illustrated as being attached to the fish holder in Figures 2, 3 and 4, it is readily apparent that the fish hooks and their associated leaders may be of any size and secured to the holder in numerous positions.

It is preferred that all of the elements of the fish hook holder be formed of plastic, with the exception of the coil springs 62 and 64, although other materials may be utilized in the construction of the fish hook holder. However, regardless of what materials the fish hook holder is formed, it is desired that the side walls 12 and 14 be of such extent that the arcuate slide plate 20, its associated hook elements 22, and the fish hooks 44 and their associated leaders 50 be entirely below the planes passed through adjacent edges of the side walls 12 and 14 in order to be completely enclosed therein.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A fish hook and leader holder comprising a housing having an arcuate surface portion, a corresponding arcuate slide member slidably mounted on said arcuate surface portion, a plurality of hook elements carried by said slide member and adapted to be engaged by loop ends of leaders, said housing having openings for receiving the hook portions of fish hooks carried by said leaders, and means for sliding said slide member to tension said leaders.

2. A fish hook and leader holder comprising a housing having an arcuate surface portion, a corresponding arcuate slide member slidably mounted on said arcuate surface portion, a plurality of hook elements carried by said slide member and adapted to be engaged by loop ends of leaders, said housing having openings for receiving the hook portions of fish hooks carried by said leaders, and means for sliding said slide member to tension said leaders, said means including spring elements carried by said housing and attached to said slide member.

3. The holder of claim 2 wherein said spring elements are mounted entirely within said housing.

4. A fish hook and leader holder comprising a housing having an arcuate surface portion, a corresponding arcuate slide member slidably mounted on said arcuate surface portion, a plurality of hook elements carried by said slide member and adapted to be engaged by loop ends of leaders, said housing having openings for receiving the hook portions of fish hooks carried by said leaders, means for sliding said slide member to tension said leaders, said arcuate surface portion being provided with slots therein, and guide elements carried by said slide member guidingly disposed within said slots.

5. A fish hook and leader holder comprising a housing having an arcuate surface portion, a corresponding arcuate slide member slidably mounted on said arcuate surface portion, a plurality of hook elements carried by said slide member and adapted to be engaged by loop ends of leaders, said housing having openings for receiving the hook portions of fish hooks carried by said leaders, means for sliding said slide member to tension said leaders, said arcuate surface portion being provided with slots therein, and guide elements carried by said slide member guidingly disposed within said slots, said means including spring elements carried by said housing and attached to said guide elements.

6. A fish hook and leader holder comprising a housing including a bottom wall, semi-circular side walls and an arcuate top surface portion, said side walls extending upwardly beyond said arcuate top surface portion, an arcuate slide member slidably mounted on said arcuate surface portion and retained between the side walls, a plurality of hook elements carried by said slide member and adapted to be engaged by loop ends of leaders, said housing having openings for receiving the hook portions of fish hooks carried by said leaders, and means for sliding said slide member to tension said leaders.

7. A fish hook and leader holder comprising a housing including a bottom wall, semi-circular side walls and an arcuate top surface portion, said side walls extending upwardly beyond said arcuate top surface portion, an arcuate slide member slidably mounted on said arcuate surface portion and retained between the side walls, a plurality of hook elements carried by said slide member and adapted to be engaged by loop ends of leaders, said housing having openings for receiving the hook portions of fish hooks carried by said leaders, means for sliding said slide member to tension said leaders, and guide members carried by said base and arcuate surface portion for aligning the leaders.

ALBERT E. RANDALL.

References Cited in the file of this patent

UNITED STATES PATENTS

| Number | Name | Date |
|---|---|---|
| 1,451,256 | Gardner | Apr. 10, 1923 |
| 2,448,728 | Omohundro | Sept. 7, 1948 |
| 2,493,344 | Hamel | Jan. 3, 1950 |
| 2,584,430 | Dayton et al. | Feb. 5, 1952 |
| 2,604,721 | Casciano | July 29, 1952 |